United States Patent
McLaughlin et al.

(10) Patent No.: US 11,686,242 B2
(45) Date of Patent: Jun. 27, 2023

(54) PRE-COMBUSTION CHAMBER SYSTEM

(71) Applicant: DRESSER-RAND COMPANY, Houston, TX (US)

(72) Inventors: Ryan McLaughlin, Corning, NY (US); Kevin Alexander, Fort Collins, CO (US)

(73) Assignee: SIEMENS ENERGY, INC., Orlando, FL (US)

( * ) Notice: Subject to any disclaimer, the term of this patent is extended or adjusted under 35 U.S.C. 154(b) by 107 days.

(21) Appl. No.: 17/603,479

(22) PCT Filed: Apr. 29, 2019

(86) PCT No.: PCT/US2019/029574
§ 371 (c)(1),
(2) Date: Oct. 13, 2021

(87) PCT Pub. No.: WO2020/222728
PCT Pub. Date: Nov. 5, 2020

(65) Prior Publication Data
US 2022/0178299 A1   Jun. 9, 2022

(51) Int. Cl.
*F02B 19/10*   (2006.01)
*F02B 19/12*   (2006.01)
*F02B 19/16*   (2006.01)

(52) U.S. Cl.
CPC ........ *F02B 19/1009* (2013.01); *F02B 19/108* (2013.01); *F02B 19/12* (2013.01); *F02B 19/16* (2013.01)

(58) Field of Classification Search
CPC .... F02B 19/1009; F02B 19/108; F02B 19/12; F02B 19/16
See application file for complete search history.

(56) References Cited

U.S. PATENT DOCUMENTS 3,349,758 A   10/1967 Gragson
4,116,234 A   9/1978 Yanagihara et al.
(Continued)

FOREIGN PATENT DOCUMENTS

| CN | 106870095 A | 6/2017 |
|---|---|---|
| EP | 2998538 A1 | 3/2016 |
| JP | S4323601 Y1 | 10/1968 |

OTHER PUBLICATIONS

PCT International Search Report and Written Opinion dated Dec. 10, 2019 corresponding to PCT Application No. PCT/US2019/029574 filed Apr. 29, 2019.

*Primary Examiner* — Xiao En Mo

(57) ABSTRACT

A pre-combustion chamber system is presented. The pre-combustion chamber system includes a pre-combustion chamber housing defining a pre-combustion chamber, a cooling chamber housing surrounding the pre-combustion chamber housing, a cooling chamber defined between the pre-combustion chamber housing and the cooling chamber housing. The pre-combustion chamber system includes a flow agitator arranged in the pre-combustion chamber housing protruding into the pre-combustion chamber. The flow agitator increases flow disturbance in the pre-combustion chamber for improving mixture of fuel and air. Cooling of the pre-combustion chamber system is improved by dividing the cooling chamber into a cooling inner chamber and a cooling outlet chamber or by arranging cooling fins in the pre-combustion chamber housing extending into the cooling chamber.

14 Claims, 6 Drawing Sheets

(56) References Cited

U.S. PATENT DOCUMENTS

| | | | |
|---|---|---|---|
| 4,332,224 A | | 6/1982 | Latsch et al. |
| 5,555,867 A | | 9/1996 | Freen |
| 5,662,082 A | * | 9/1997 | Black ..................... F02B 19/16 29/888.01 |
| 2002/0104507 A1 | * | 8/2002 | Riggs ..................... F02B 19/12 123/266 |
| 2014/0083391 A1 | | 3/2014 | Gruber |

* cited by examiner

PRE-COMBUSTION CHAMBER SYSTEM

TECHNICAL FIELD OF THE INVENTION

This invention relates generally to a pre-combustion chamber system, in particular, a pre-combustion chamber system for an internal combustion engine.

DESCRIPTION OF THE RELATED ART

An internal combustion engine is commonly used in the oil and gas industry. The internal combustion engine is typically supplied with a mixture of air and fuel contained in a main combustion chamber. A spark plug is usually used in the combustion chamber for igniting the air-fuel mixture. In order to reduce emission and increase fuel efficiency, the air-fuel mixture is made leaner. A leaner air-fuel mixture contains a relatively high ratio of air to fuel. However, lean fuel mixture may result in misfires, incomplete combustion, etc. A pre-combustion chamber system may be used to provide a higher energy ignition source for the combustion engine.

A pre-combustion chamber system is a small combustion chamber communicating with the main combustion chamber. Fuel is injected into the pre-combustion chamber system and mixed with air. The mixture is ignited at a proper time with a spark plug. The burning mixture from the pre-combustion chamber system enter the main combustion chamber containing the lean fuel mixture. The burning mixture from the pre-combustion chamber system may provide sufficient energy and a stronger point of ignition to initiate combustion of the lean fuel mixture in the main combustion chamber. Usually, if a combustion in a pre-combustion chamber system is satisfied, which means the combustion is complete and on time in the pre-combustion chamber system, a combustion in a main combustion chamber is satisfied. There is need for a more reliable and efficient pre-combustion chamber system for an internal combustion engine.

SUMMARY OF THE INVENTION

Briefly described, aspects of the present invention relate to a pre-combustion chamber system and a method for operating a pre-combustion chamber system.

According to an aspect, a pre-combustion chamber system is presented. The pre-combustion chamber system comprises a pre-combustion chamber housing surrounding an interior cavity for defining a pre-combustion chamber. The pre-combustion chamber system comprises a cooling chamber housing surrounding the pre-combustion chamber housing and sealed together with the pre-combustion chamber housing at two longitudinal ends forming a top portion and a bottom portion. The pre-combustion chamber system comprises a cooling chamber defined between the pre-combustion chamber housing and the cooling chamber housing. The pre-combustion chamber system comprises a flow agitator arranged in the pre-combustion chamber housing protruding into the pre-combustion chamber. The flow agitator is configured to increase flow disturbance in the pre-combustion chamber.

According to an aspect, a method for making a pre-combustion chamber system is presented. The pre-combustion chamber system comprises a pre-combustion chamber housing surrounding an interior cavity for defining a pre-combustion chamber, a cooling chamber housing surrounding the pre-combustion chamber housing and sealed together with the pre-combustion chamber housing at two longitudinal ends forming a top portion and a bottom portion, a cooling chamber defined between the pre-combustion chamber housing and the cooling chamber housing. The method comprises forming a flow agitator in the pre-combustion chamber housing protruding into the pre-combustion chamber. The flow agitator is configured to increase flow disturbance in the pre-combustion chamber.

According to an aspect, a pre-combustion chamber is presented. The pre-combustion chamber comprises a pre-combustion chamber housing surrounding an interior cavity for defining the pre-combustion chamber. The pre-combustion chamber comprises a flow agitator arranged in the pre-combustion chamber housing protruding into the pre-combustion chamber. The flow agitator is configured to increase flow disturbance in the pre-combustion chamber.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

Figure 1:
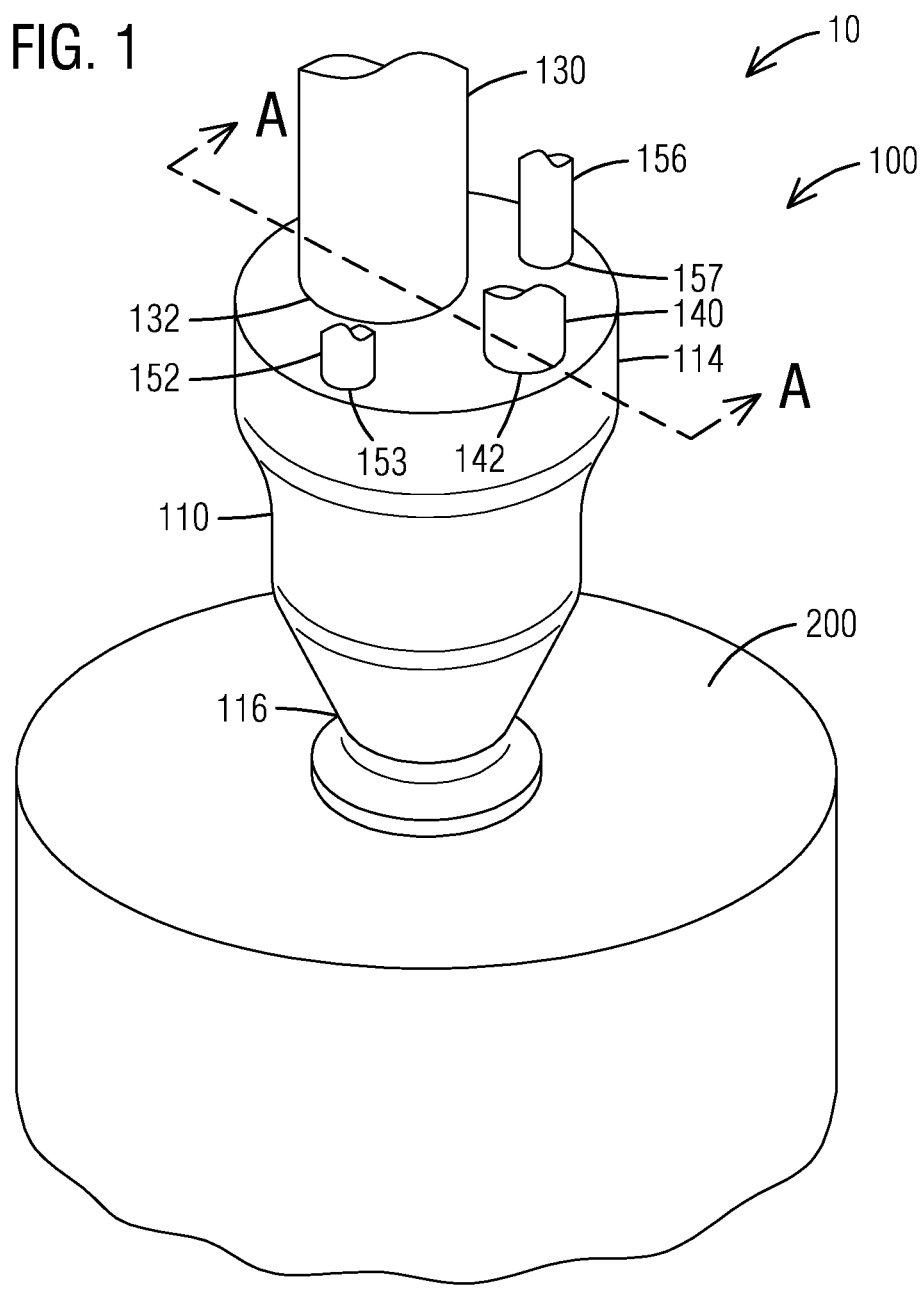
FIG. 1 is a schematic perspective view of an internal combustion engine having a pre-combustion chamber system according to an embodiment of the present invention.

FIG. 1 is a schematic perspective view of an internal combustion engine 10 having a pre-combustion chamber system 100 according to an embodiment of the present invention. As shown in FIG. 1, the internal combustion engine 10 includes a pre-combustion chamber system 100 and a main combustion chamber 200. The pre-combustion chamber system 100 includes a cooling chamber housing 110, a top portion 114 and a bottom portion 116. The main combustion chamber 200 is connected to the bottom portion 116 of the pre-combustion chamber system 100.

The pre-combustion chamber system 100 includes a pre-combustion chamber housing 112 (shown in FIGS. 2 to 11) that is surrounded by the cooling chamber housing 110 with a space therebetween for defining a cooling chamber 150 (shown in FIGS. 2 to 11). The pre-combustion chamber housing 112 and the cooling chamber housing 110 are sealed together at two longitudinal ends forming the top portion 114 and the bottom portion 116. The pre-combustion chamber housing 112 and the cooling chamber housing 110 may be sealed together at the top portion 114 and the bottom portion 116 or may be formed as an integral piece at the top portion 114 and the bottom portion 116. The pre-combustion chamber housing 112 surrounds an interior cavity that defines a pre-combustion chamber 120, which are illustrated in detail with reference to FIGS. 2 to 11. The pre-combustion chamber system 100 includes a spark plug 130. The spark plug 130 is installed in a spark plug port 132 disposed at the top portion 114 and extends into the pre-combustion chamber 120. The spark plug 130 may be threaded to the spark plug port 132. The pre-combustion chamber system 100 includes a fuel supply line 140. The fuel supply line 140 is installed in a fuel supply port 142 disposed at the top portion 114 and extends into the pre-combustion chamber 120. The fuel supply line 140 may be threaded to the fuel supply port 142. The pre-combustion chamber system 100 includes a coolant inlet tube 152 and a coolant outlet tube 156. The coolant inlet tube 152 and the coolant outlet tube 156 are respectively installed in a coolant inlet hole 153 and a coolant outlet hole 157 disposed at the top portion 114 and communicate with the cooling chamber 150.

During operation of the internal combustion engine 10, a fuel is injected into the pre-combustion chamber 120 through the fuel supply line 140. The fuel is mixed with air in the pre-combustion chamber 120. The mixture of fuel and air is ignited by the spark plug 130. The burning mixture of air and fuel expands and is expelled out the pre-combustion chamber system 100 from the bottom portion 116 through a nozzle 118 (shown in FIGS. 2 to 11) and enter the main combustion chamber 200. The pre-combustion chamber 120 is continuously cooled by coolant in the cooling chamber 150 during operation. The coolant continuously circulates in the cooling chamber 150 via the coolant inlet tube 152 and the coolant outlet tube 156 during operation. The coolant may be water, or any suitable coolants known in the industry.

Figure 2:
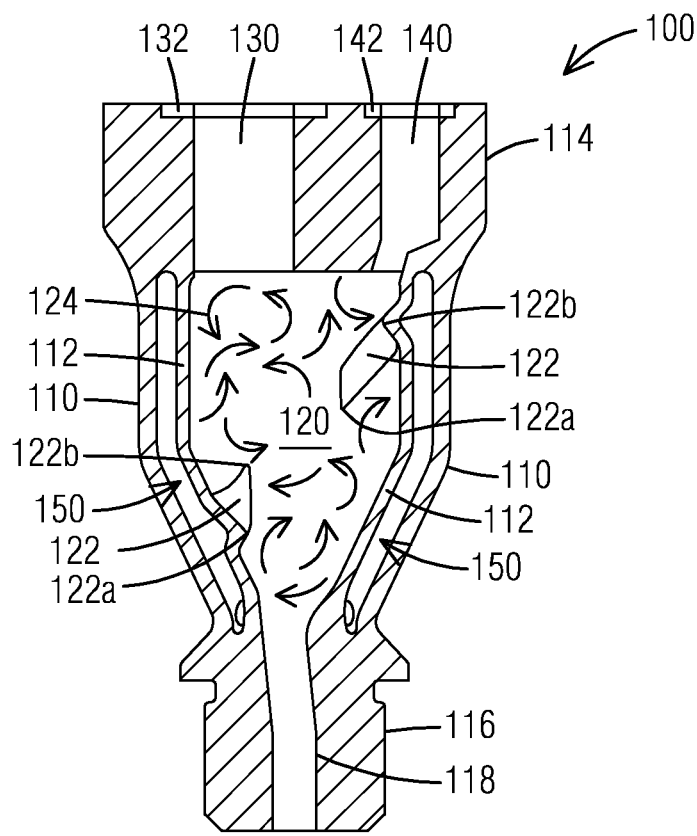
FIGS. 2 to 11 are schematic views of a pre-combustion chamber system according to various embodiments of the present invention.

FIG. 2 is a schematic longitudinal cross section view of a pre-combustion chamber system 100 taken along line A-A of FIG. 1 according to an embodiment of the present invention. As shown in the exemplary embodiment of FIG. 2, the pre-combustion chamber system 100 includes a pre-combustion chamber housing 112. The pre-combustion chamber housing 112 surrounds an interior cavity which defines a pre-combustion chamber 120. The pre-combustion chamber housing 112 is surrounded by the cooling chamber housing 110 with a space therebetween which defines a cooling chamber 150. The pre-combustion chamber housing 112 and the cooling chamber housing 110 may be sealed together at two longitudinal ends forming a top portion 114 and a bottom portion 116. The cooling chamber 150 is in communication with the coolant inlet tube 152 and the coolant outlet tube 156 as shown in FIG. 1. During operation, coolant continuously circulates in the cooling chamber 150 through the coolant inlet tube 152 and the coolant outlet tube 156 for cooling the pre-combustion chamber 120. The pre-combustion chamber system 100 includes a nozzle 118. The nozzle 118 is disposed at a bottom of the pre-combustion chamber 120 and extends through the bottom portion 116 for expelling the burning mixture of air and fuel out of the pre-combustion chamber 120 into the main combustion chamber 200 (shown in FIG. 1). In the exemplary embodiment as shown in FIG. 2, the pre-combustion chamber housing 112 and the cooling chamber housing 110 have a generally cylindrical shape and a generally conical shape toward the bottom portion 116. It is understood that the pre-combustion chamber housing 112 and cooling chamber housing 110 may have any suitable shapes, such as a straight generally cylindrical shape.

The pre-combustion chamber system 100 includes at least one flow agitator 122. The flow agitator 122 is a structure arranged in the pre-combustion chamber housing 112. The flow agitator 122 may tumble flow in the pre-combustion chamber 120 to increase flow disturbance in the pre-combustion chamber 120 for promoting an agitated flow 124 in the pre-combustion chamber 120. The agitated flow 124 circulates in the pre-combustion chamber 120 in a more random and disturbed manner. The agitated flow 124 may improve mixing between the fuel and air and creates a more homogeneous mixture of the fuel and air in the pre-combustion chamber 120 for the internal combustion engine 10. The more homogeneous mixture of the fuel and air in the pre-combustion chamber 120 may reduce a fuel requirement for the internal combustion engine 10 which may result in a reduction in emission of the internal combustion engine 10. The more homogeneous mixture of the fuel and air in the pre-combustion chamber 120 may result in an increased stability of the internal combustion engine 10.

The flow agitator 122 may be a structure arranged in the pre-combustion chamber housing 112 that protrudes into the pre-combustion chamber 120. The flow agitator 122 may be a portion of the pre-combustion chamber housing 112 that protrudes into the pre-combustion chamber 120. According to the exemplary embodiment as illustrated in FIG. 2, the pre-combustion chamber housing 112 may have the same thickness. It is understood that a portion of the pre-combustion chamber housing 112 may have a thicker thickness protruding into the pre-combustion chamber 120 to form the flow agitator 122. The flow agitator 122 may have any suitable shapes of protrusion, such as elliptical shape protrusion, trapezoidal shape protrusion, square shape protrusion, rectangular shape protrusion, clipped delta shape protrusion, etc. Shapes of the flow agitator 122 is determined to promote desired agitator flow 124 based on design requirements of the internal combustion engine 10.

The flow agitator 122 may span at least a sector of a circumference of the pre-combustion chamber housing 112. For example, the flow agitator 122 may cover an 80 degree sector of the circumference of the pre-combustion chamber housing 112, or a 100 degree sector of the circumference of the pre-combustion chamber housing 112, or a 120 degree sector of the circumference of the pre-combustion chamber housing 112, or a 140 degree sector of the circumference of the pre-combustion chamber housing 112, etc. It is understood that the flow agitator 122 may cover any desired degree sectors of the pre-combustion chamber housing 112 based on design requirements of the internal combustion engine 10. The flow agitator 122 may span the entire circumference of the pre-combustion chamber housing 112. The flow agitator 122 may also span greater than the entire circumference of the pre-combustion chamber housing 112. The pre-combustion chamber system 100 may include a plurality of flow agitators 122 arranged in the pre-combustion chamber housing 112. The plurality of flow agitators 122 may be arranged at different longitudinal locations in the pre-combustion chamber housing 112. The plurality of flow agitators 122 may span different sectors of the circumference of the pre-combustion chamber housing 112. The plurality of flow agitators 122 may span different sections that may overlap a portion in the circumference of the pre-combustion chamber housing 112. Quantity of the flow agitator 122 is determined to promote desired agitator flow 124 based on design requirements of the internal combustion engine 10.

The flow agitator 122 may be an integral piece of the pre-combustion chamber 120. The flow agitator 122 may be integrally manufactured to the pre-combustion chamber 120 using additive manufacturing. The flow agitator 122 may be integrally manufactured to the pre-combustion chamber 120 using traditional manufacturing, such as casting. The flow agitator 122 may have a desired wall thickness that is controlled to minimize a likelihood of creating a hot spot.

Figure 3:
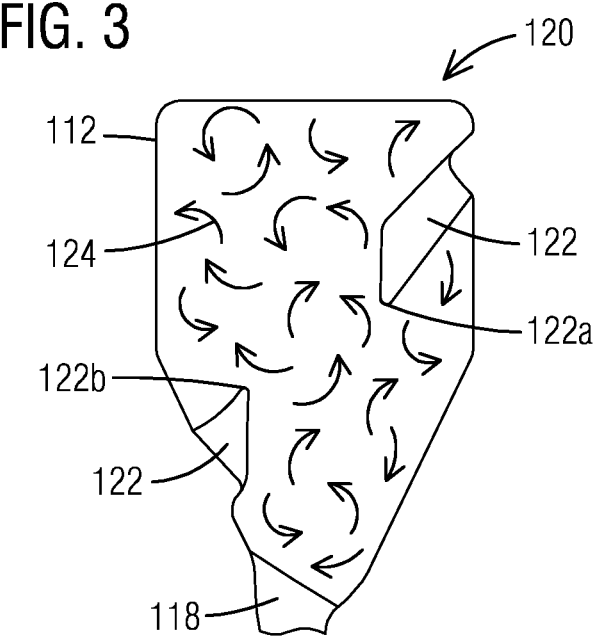

FIG. 3 is a schematic perspective view of a pre-combustion chamber 120 according to an exemplary embodiment shown in FIG. 2. With references to FIGS. 2 and 3, the pre-combustion chamber system 100 includes two inclined flow agitators 122. The two inclined flow agitators 122 are located at two different longitudinal locations. One of the flow agitators 122 may be located close to the top portion 114. The other one of the flow agitators 122 may be located close to the bottom portion 116. Each of the inclined flow agitator 122 may include a protrusion that has a first end 122a located at a lower longitudinal location in the pre-combustion chamber housing 112 than a second end 122b. Each of the two inclined flow agitators 122 spans a sector of the circumference of the pre-combustion chamber housing 112. The two inclined flow agitators 122 are separated with each other in the circumference of the pre-combustion chamber housing 112. It is understood that at least one of the inclined flow agitators 122 may span the entire circumference of the pre-combustion chamber housing 112.

Figure 4:
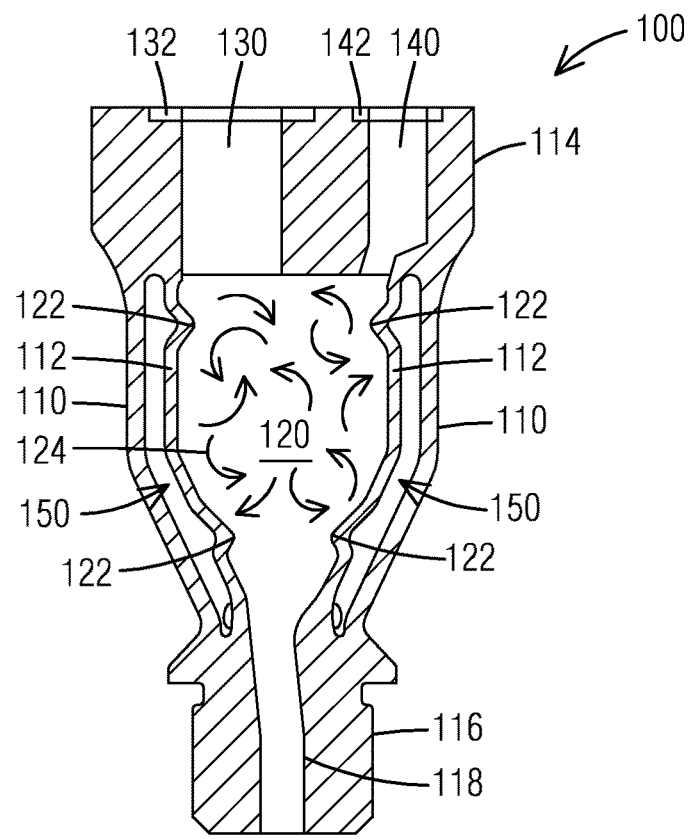
Figure 5:
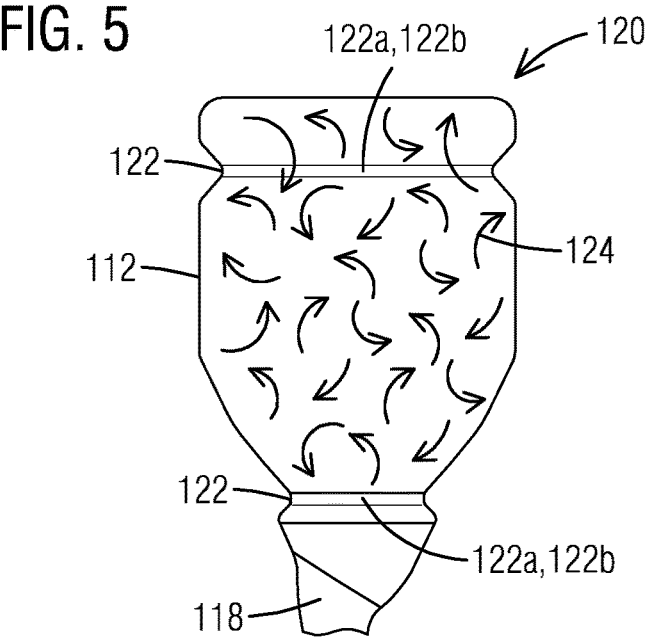

FIG. 4 is a schematic longitudinal cross section view of a pre-combustion chamber system 100 taken along line A-A of FIG. 1 according to another embodiment of the present invention. FIG. 5 a schematic perspective view of a pre-combustion chamber 120 according to an exemplary embodiment shown in FIG. 4. With references to FIGS. 4 and 5, the pre-combustion chamber system 100 includes two straight flow agitators 122. The two straight flow agitators 122 are located at two different longitudinal locations. One of the straight flow agitators 122 may be located close to the top portion 114. The other one of straight the flow agitators 122 may be located close to the bottom portion 116. Each of the straight flow agitator 122 may include a protrusion that has two ends 122a and 122b located at the same longitudinal locations in the pre-combustion chamber housing 112. According to the exemplary embodiment shown in FIGS. 4 and 5, each of the two straight flow agitators 122 spans the entire circumference of the pre-combustion chamber housing 112 so that the first end 122a and the second end 122b meet. It is understood that at least one of the straight flow agitators 122 may span a section of the circumference of the pre-combustion chamber housing 112.

Figure 6:
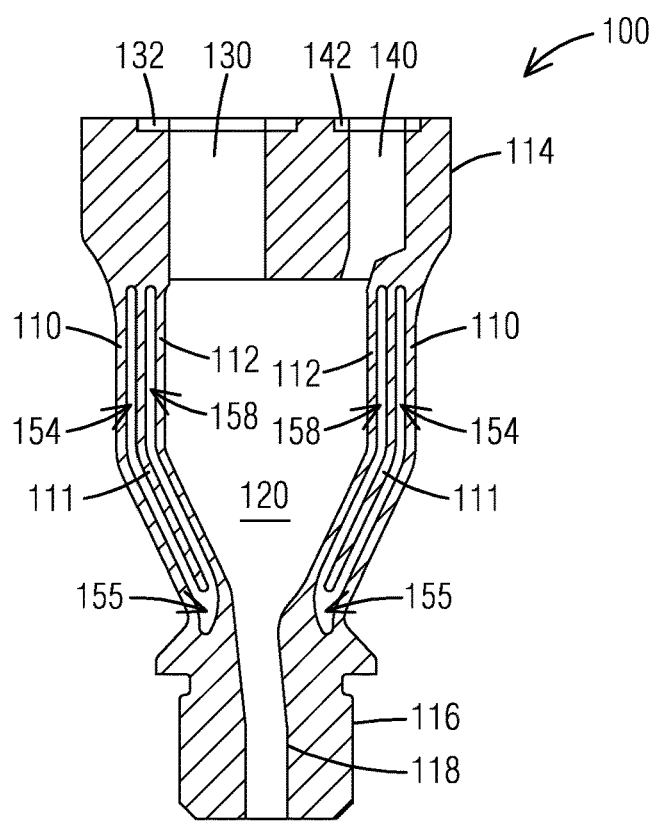

FIG. 6 is a schematic longitudinal cross section view of a pre-combustion chamber system 100 taken along line A-A of FIG. 1 according to an embodiment of the present invention. As shown in the exemplary embodiment of FIG. 6, the pre-combustion chamber system 100 includes a panel 111 arranged between the cooling chamber housing 110 and the pre-combustion chamber housing 112. The panel 111 divides the cooling chamber 150 into two cooling chambers, a cooling inlet chamber 154 and a cooling outlet chamber 158. The cooling inlet chamber 154 is defined between the panel 111 and the cooling chamber housing 110. The cooling outlet chamber 158 is defined between the panel 111 and the pre-combustion chamber housing 112. The panel 111 is sealed together with the cooling chamber housing 110 and the pre-combustion chamber housing 112 at the top portion 114. The panel 111 is not sealed together with the cooling chamber housing 110 and the pre-combustion chamber housing 112 at the bottom portion 116 which leaves an opening 155 at the bottom of the cooling chamber 150 which may correspond to the hottest portion of the pre-combustion chamber 120. The cooling inlet chamber 154 and the cooling outlet chamber 158 communicate with each other through the opening 155. The cooling inlet chamber 154 also communicates with the coolant inlet tube 152 (shown in FIG. 1). The cooling outlet chamber 158 also communicates with the coolant outlet tube 156 (shown in FIG. 1).

The cooling inlet chamber 154 and the cooling outlet chamber 158 may be two tubes of the cooling chamber 150. The cooling chamber 150 may be manufactured as an integral piece consisting of the cooling inlet chamber 154 and the cooling outlet chamber 158 which eliminates a need for securing the cooling inlet chamber 154 and the cooling outlet chamber 158 together. The cooling chamber 150 having the divided cooling inlet chamber 154 and the cooling outlet chamber 158 may be integrally manufactured using additive manufacturing, or using traditional manufacturing methods, such as casting.

During operation, coolant is continuously supplied to the cooling inlet chamber 154 via the coolant inlet tube 152 and enters the cooling outlet chamber 158 through the opening 155 at the bottom of the cooling chamber 150. The coolant circulates in the cooling outlet chamber 158 and exits the cooling outlet chamber 158 via the coolant outlet tube 156. The coolant cools the pre-combustion chamber 120 while circulating in the cooling outlet chamber 158. As shown in FIG. 6, the divided cooling inner chamber 154 and the cooling outer chamber 158 may ensure the coolant is directed to the bottom of the pre-combustion chamber 120 which may be the hottest portion of the pre-combustion chamber 120. The divided cooling inner chamber 154 and the cooling outer chamber 158 may increase heat exchange of the cooling chamber 150 which may improve longevity of the pre-combustion chamber system 100 and reduces misfiring or pre-combustion/detonation due to overheating of the pre-combustion chamber 120.

Figure 7:
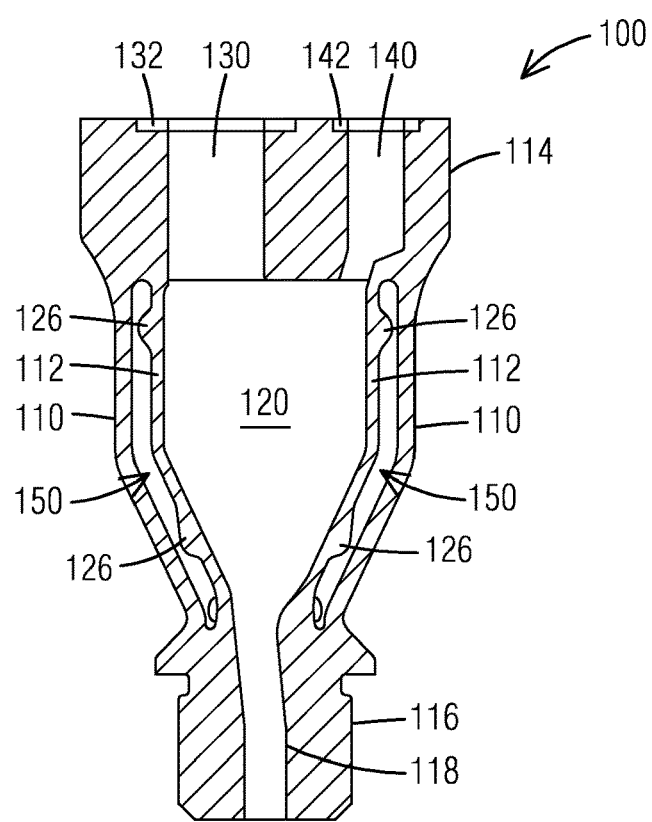
Figure 8:
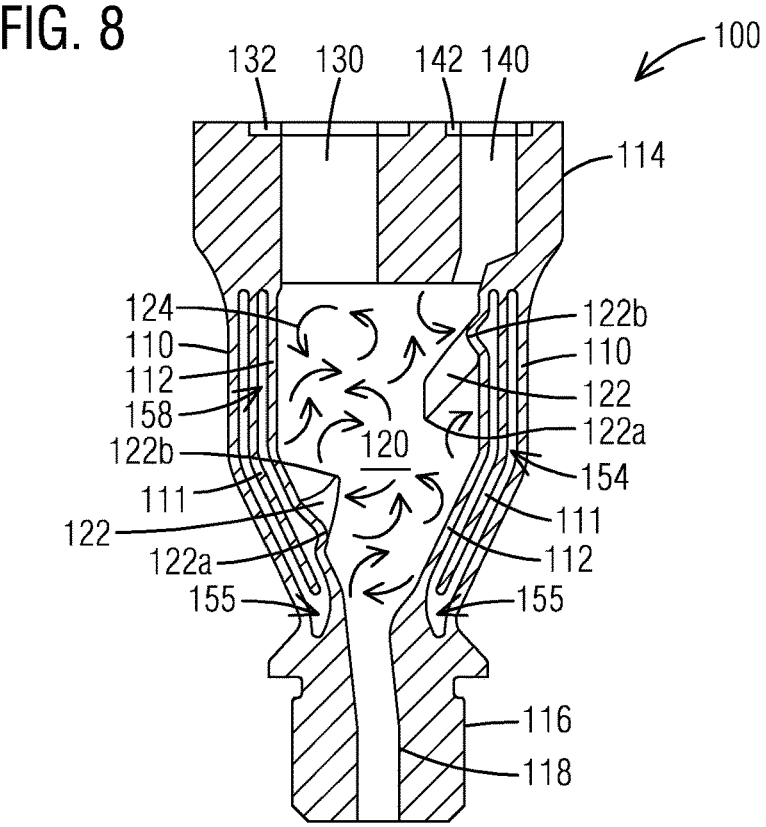
Figure 9:
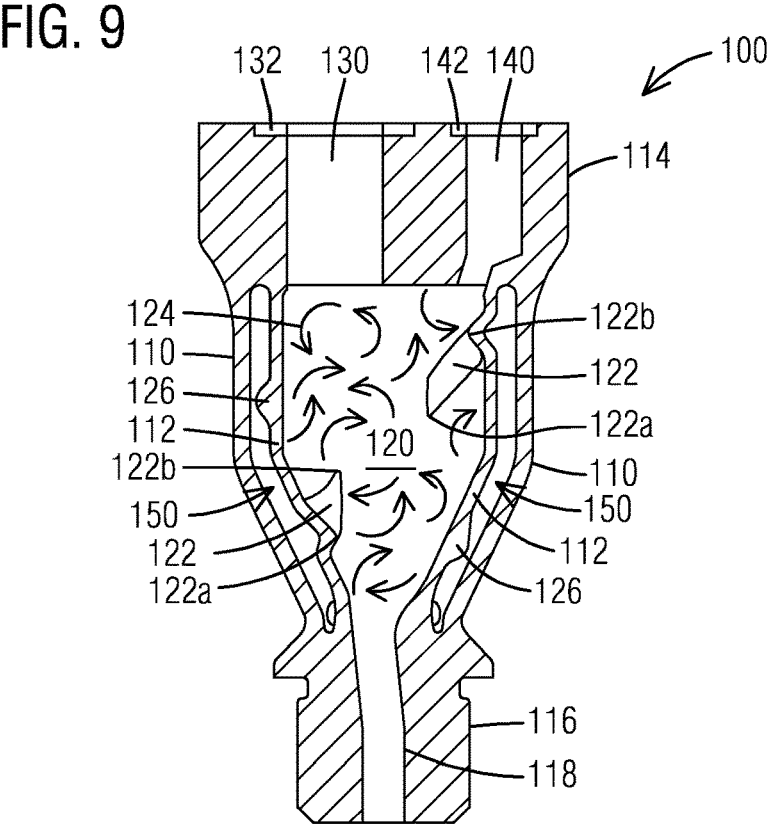
Figure 10:
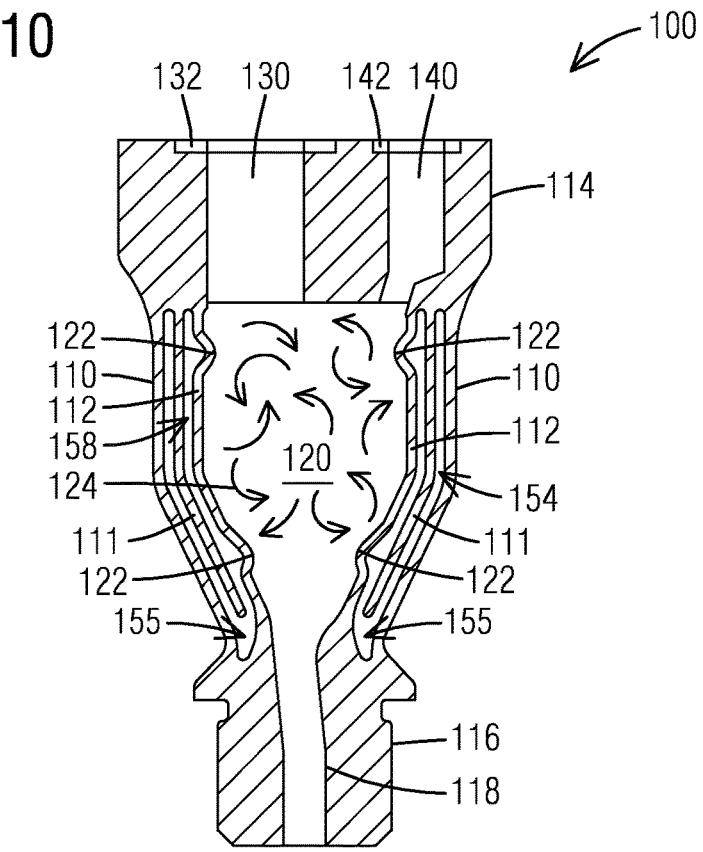
Figure 11:
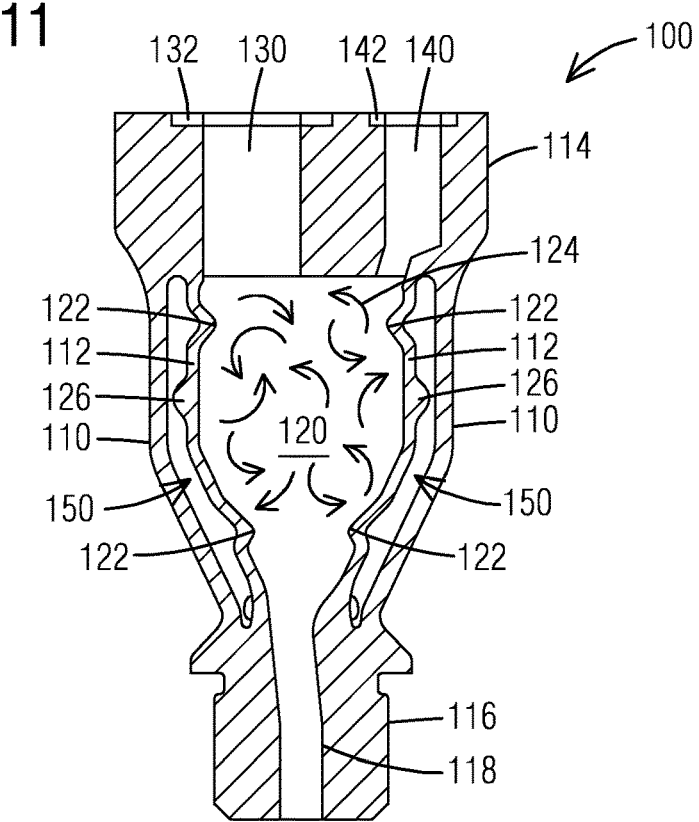

FIG. 7 is a schematic longitudinal cross section view of a pre-combustion chamber system 100 taken along line A-A of FIG. 1 according to an embodiment of the present invention. As shown in the exemplary embodiment of FIG. 7, the pre-combustion chamber system 100 includes at least a cooling fin 126. The cooling fin 126 is arranged in the pre-combustion chamber housing 112. The cooling fin 126 may extend into the cooling chamber 150. The cooling fin 126 may increase heat exchange of the cooling chamber 150 which may improve longevity of the pre-combustion chamber system 100 and reduces misfiring or pre-combustion/detonation due to overheating of the pre-combustion chamber 120. The cooling fin 126 may have any suitable shapes, such as elliptical shape, trapezoidal shape, square shape, rectangular shape, clipped delta shape, etc. The cooling fin 126 may be manufactured as an integral piece of the cooling chamber 150 which eliminates a need for securing the cooling fin 126 in the cooling chamber 150. The cooling fin 126 may be integrally manufactured using additive manufacturing, or using traditional manufacturing methods, such as casting. The pre-combustion chamber system 100 may include a plurality of cooling fins 126 arranged at different locations of the pre-combustion chamber housing 112. The cooling fins 126 may extend into the cooling chamber 150.

FIGS. 8 to 11 are schematic longitudinal cross section views of a pre-combustion chamber system 100 taken along line A-A of FIG. 1 according to various embodiments of the present invention. As shown in an exemplary embodiment of FIG. 8, the pre-combustion chamber system 100 includes at least one inclined flow agitator 122 to increase flow disturbance in the pre-combustion chamber 120 for promoting agitated flow 124. The pre-combustion chamber system 100 may also include a divided cooling chamber 150 having a cooling inlet chamber 154 and a cooling outlet chamber 158 to increase heat exchange. As shown in an exemplary embodiment of FIG. 9, the pre-combustion chamber system 100 includes at least one inclined flow agitator 122 to increase flow disturbance in the pre-combustion chamber 120 for promoting agitated flow 124. The pre-combustion chamber system 100 may also include at least a cooling fin 126 to increase heat exchange. As shown in an exemplary embodiment of FIG. 10, the pre-combustion chamber system 100 includes at least one straight flow agitator 122 to increase flow disturbance in the pre-combustion chamber 120 for promoting agitated flow 124. The pre-combustion chamber system 100 also includes a divided cooling chamber 150 having a cooling inlet chamber 154 and a cooling outlet chamber 158 to increase heat exchange. As shown in an exemplary embodiment of FIG. 11, the pre-combustion chamber system 100 includes at least one straight flow agitator 122 to increase flow disturbance in the pre-combustion chamber 120 for promoting agitated flow 124. The pre-combustion chamber system 100 also include at least a cooling fin 126 to increase heat exchange.

According to an aspect, the proposed pre-combustion chamber system 100 may include at least a flow agitator 122 to increase flow disturbance in the pre-combustion chamber 120 for promoting more random and disturbed agitated flow 124 in the pre-combustion chamber 120. The agitated flow 124 circulates in the pre-combustion chamber 120 to improve mixing between fuel and air in the pre-combustion chamber 120 to create more homogeneous mixture of fuel and air in the pre-combustion chamber 120 which may reduce fuel requirement, reduce emission, and/or increase stability of an internal combustion engine 10. The flow agitator 122 may be manufactured as an integral piece of the pre-combustion chamber 120 using additive manufacturing or using traditional manufacturing methods which may reduce manufacturing operations and cost.

According to an aspect, the proposed pre-combustion chamber system 100 may increase heat exchange of a cooling chamber 150 using divided cooling chamber 150 having a cooling inlet chamber 154 and a cooling outlet chamber 158 or using a cooling fin 126 arranged in the pre-combustion chamber housing 112 extending into the cooling chamber 150. The proposed pre-combustion chamber system 100 may thus improve longevity of the pre-combustion chamber system 100 and reduce misfiring or pre-combustion/detonation due to overheating of the pre-combustion chamber 120.

According to an aspect, the cooling chamber 150 may be manufactured as an integral piece consisting of the cooling inlet chamber 154 and the cooling outlet chamber 158. The cooling chamber 150 may be manufactured as an integral piece consisting of the cooling fins 126. The integral cooling chamber 150 may reduce manufacturing operations and cost. The integral cooling chamber 150 may be manufactured using additive manufacturing or using traditional manufacturing methods.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

10: Internal Combustion Engine
100: Pre-combustion Chamber System
110: Cooling Chamber Housing
111: Panel
112: Pre-combustion Chamber Housing
114: Top Portion
116: Bottom Portion
118: Nozzle
120: Pre-combustion Chamber
122: Flow Agitator
122$a$: First End of Flow agitator
122$b$: Second End of Flow agitator
124: Agitated Flow
126: Cooling Fin
130: Spark Plug
132: Spark Plug Port
140: Fuel Supply
142: Fuel Supply Port
150: Cooling Chamber
152: Coolant Inlet Tube
153: Coolant Inlet Hole
154: Cooling Inlet Chamber
155: Opening
156: Coolant Outlet Tube
157: Coolant Outlet Hole
158: Cooling Outlet Chamber
200: Main Combustion Chamber

What is claimed is:

1. A pre-combustion chamber system comprising:
   a pre-combustion chamber housing surrounding an interior cavity for defining a pre-combustion chamber;
   a cooling chamber housing surrounding the pre-combustion chamber housing and sealed together with the pre-combustion chamber housing at two longitudinal ends forming a top portion and a bottom portion;
   a cooling chamber defined between the pre-combustion chamber housing and the cooling chamber housing;
   a flow agitator arranged in the pre-combustion chamber housing protruding into the pre-combustion chamber, wherein the flow agitator is configured to increase flow disturbance in the pre-combustion chamber; and
   a panel arranged between the pre-combustion chamber housing and the cooling chamber housing, wherein the panel is configured to divide the cooling chamber into a cooling inlet chamber and a cooling outlet chamber, wherein the panel is sealed together with the pre-combustion chamber housing and the cooling chamber housing at the top portion, wherein the panel leaves an opening at a bottom of the cooling chamber, and wherein the cooling inlet chamber and the cooling outlet chamber communicate with each other through the opening at the bottom of the cooling chamber.

2. The pre-combustion chamber system as claimed in claim 1, wherein the flow agitator comprises an inclined protrusion having one end located at a lower longitudinal location than the other end in the pre-combustion chamber housing.

3. The pre-combustion chamber system as claimed in claim 1, wherein the flow agitator comprises a straight protrusion having two ends located at the same longitudinal locations in the pre-combustion chamber housing.

4. The pre-combustion chamber system as claimed in claim 1, wherein the flow agitator spans at least a sector of a circumference of the pre-combustion chamber housing.

5. The pre-combustion chamber system as claimed in claim 1, further comprising a plurality of flow agitators arranged in the pre-combustion chamber housing.

6. The pre-combustion chamber system as claimed in claim 1, further comprising a cooling fin arranged in the pre-combustion chamber housing extending into the cooling chamber.

7. A method for making a pre-combustion chamber system, wherein the pre-combustion chamber system comprises a pre-combustion chamber housing surrounding an interior cavity for defining a pre-combustion chamber, a cooling chamber housing surrounding the pre-combustion chamber housing, the pre-combustion chamber housing and the cooling chamber housing sealed together at two longitudinal ends forming a top portion and a bottom portion, a cooling chamber defined between the pre-combustion chamber housing and the cooling chamber housing, the method comprising:

forming a flow agitator in the pre-combustion chamber housing protruding into the pre-combustion chamber, wherein the flow agitator is configured to increase flow disturbance in the pre-combustion chamber; and forming a panel between the pre-combustion chamber housing and the cooling chamber housing, wherein the panel is configured to divide the cooling chamber into a cooling inlet chamber and a cooling outlet chamber, wherein the panel is formed such that the panel is sealed together with the pre-combustion chamber housing and the cooling chamber housing at the top portion and leaves an opening at a bottom of the cooling chamber, and wherein the cooling inlet chamber and the cooling outlet chamber communicates with each other through the opening at the bottom of the cooling chamber.

8. The method as claimed in claim 7, wherein the flow agitator is formed as an inclined protrusion having one end located at a lower longitudinal location than the other end in the pre-combustion chamber housing.

9. The method as claimed in claim 7, wherein the flow agitator is formed as a straight protrusion having two ends located at the same longitudinal locations in the pre-combustion chamber housing.

10. The method as claimed in claim 7, wherein the flow agitator is formed to span at least a sector of a circumference of the pre-combustion chamber housing.

11. The method as claimed in claim 7, further comprising forming a plurality of flow agitators in the pre-combustion chamber housing.

12. The method as claimed in claim 7, further comprising forming a cooling fin in the pre-combustion chamber housing extending into the cooling chamber.

13. A pre-combustion chamber comprising:

a pre-combustion chamber housing surrounding an interior cavity for defining the pre-combustion chamber;

a cooling chamber housing surrounding the pre-combustion chamber housing and sealed together with the pre-combustion chamber housing at two longitudinal ends forming a top portion and a bottom portion;

a cooling chamber defined between the pre-combustion chamber housing and the cooling chamber housing; and a panel arranged between the pre-combustion chamber housing and the cooling chamber housing, wherein the panel is configured to divide the cooling chamber into a cooling inlet chamber and a cooling outlet chamber, wherein the panel is sealed together with the pre-combustion chamber housing and the cooling chamber housing at the top portion, wherein the panel leaves an opening at a bottom of the cooling chamber, and wherein the cooling inlet chamber and the cooling outlet chamber communicate with each other through the opening at the bottom of the cooling chamber.

14. The pre-combustion chamber system as claimed in claim 13, further comprising a cooling fin arranged in the pre-combustion chamber housing extending into the cooling chamber.

\* \* \* \* \*